United States Patent
Fullerton et al.

(10) Patent No.: US 8,087,613 B2
(45) Date of Patent: Jan. 3, 2012

(54) MODULAR PASSENGER SEAT FOR AN AIRCRAFT

(75) Inventors: James A. Fullerton, Bothell, WA (US);
Scott E. Coburn, Newcastle, WA (US);
R. Klaus Brauer, Seattle, WA (US);
Blake Emery, Kirkland, WA (US);
Sebastian Petry, Seattle, WA (US);
Jeffrey Bernett, New York, NY (US);
Don Chadwick, Los Angeles, CA (US);
David Wykes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/960,855

(22) Filed: Dec. 6, 2010

(65) Prior Publication Data

US 2011/0101165 A1    May 5, 2011

Related U.S. Application Data

(62) Division of application No. 11/840,208, filed on Aug. 16, 2007, now Pat. No. 7,871,039.

(51) Int. Cl.
B64D 11/00 (2006.01)
(52) U.S. Cl. ............... 244/118.5; 244/118.6; 244/171.9
(58) Field of Classification Search ............... 244/118.5, 244/118.6, 171.9; 297/440.11, 452.12, 452.13, 297/326, 328
See application file for complete search history.

(56) References Cited

U.S. PATENT DOCUMENTS

| | | | | |
|---|---|---|---|---|
| 5,984,415 A * | 11/1999 | Schumacher et al. | ..... | 297/411.2 |
| 6,669,143 B1 * | 12/2003 | Johnson | ..... | 244/122 R |
| 6,739,671 B2 * | 5/2004 | De Maina | ..... | 297/440.1 |
| 6,824,213 B2 * | 11/2004 | Skelly et al. | ..... | 297/217.3 |
| D505,796 S * | 6/2005 | Johnson | ..... | D6/356 |
| 2004/0099766 A1 * | 5/2004 | Pratt, Jr. | ..... | 244/118.6 |

FOREIGN PATENT DOCUMENTS

WO  PCT/US2008/063792    5/2008

* cited by examiner

*Primary Examiner* — Tien Dinh
*Assistant Examiner* — Justin Benedik
(74) *Attorney, Agent, or Firm* — Tung & Associates

(57) ABSTRACT

An aircraft passenger seat assembly as described herein is formed from two primary and modular components: a structural frame that provides passenger support and dynamic load paths for the seat assembly; and a comfort frame that provides the passenger seating surface and the external upholstery layer for the seat assembly. If the seat assembly is designed for multiple passengers, then a separate comfort frame is used for each passenger seat location. The structural frame can be formed as a molded composite construction, and the comfort frame can also utilize a molded composite support frame. The support frame is used as a mounting shell for a fabric carrier that includes the external upholstery layer. The modular design and use of composite materials results in a significant weight and parts count savings relative to conventional seat designs.

5 Claims, 9 Drawing Sheets

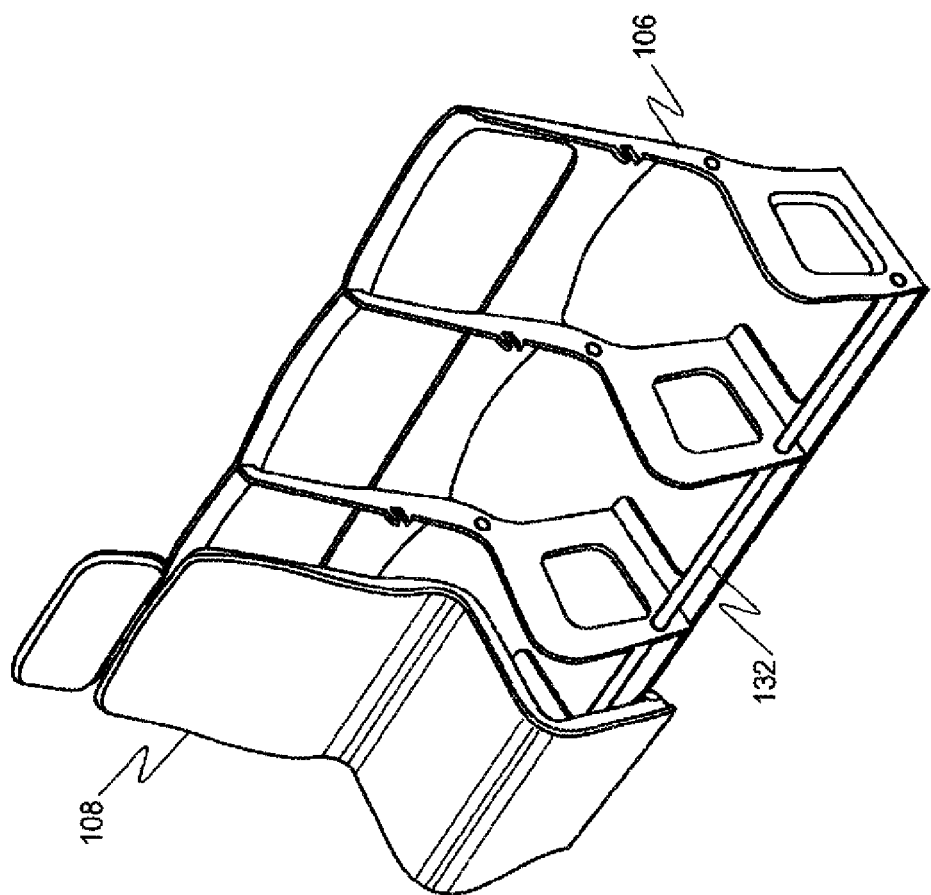

MODULAR PASSENGER SEAT FOR AN AIRCRAFT

This is a Divisional of a application Ser. No. 11/840,208, filed on Aug. 16, 2007 now U.S. Pat. No. 7,871,039.

RELATED APPLICATION

This application claims the benefit of U.S. provisional patent application Ser. No. 60/939,558, filed May 22, 2007, which is incorporated herein by reference in its entirety.

TECHNICAL FIELD

Embodiments of the subject matter described herein relate generally to aircraft components. More particularly, the subject matter relates to a lightweight modular aircraft passenger seat.

BACKGROUND

Commercial aircraft utilize different passenger seating configurations and designs. Historically, aircraft passenger seats have been manufactured using heavy and bulky materials that satisfy certain structural design requirements and passenger comfort requirements. In this regard, conventional aircraft passenger seats include a number of relatively heavy metal components. Such components can contribute a significant amount to the overall weight of an aircraft, particularly when the aircraft includes seats for hundreds of passengers. For example, the average payload allocation attributed to seats on a 777 aircraft is about six percent of the total aircraft weight.

Weight reduction is becoming increasingly important in modern aircraft design. A reduction in the weight of the aircraft structure may allow the aircraft to carry more fuel, thus extending the flight range. A reduction in the weight of the aircraft structure may also allow the aircraft to carry additional passengers and/or cargo, thus increasing the potential profitability of the aircraft. That said, the commercial aircraft industry has been reluctant to apply new lightweight solutions to seating design due primarily to cost and certification issues. Moreover, the business relationship between the seat manufacturer and the airlines has not emphasized advances in weight reduction. Typically, the airline purchasing the aircraft independently defines and purchases the passenger seats. These seats are then shipped to the airframe manufacturer for installation in the aircraft. As a result, the aircraft manufacturer has little to no control over the weight attributed to passenger seating. Seat manufacturers have had little incentive from airlines to produce lighter weight products as cost and features have a much higher priority.

BRIEF SUMMARY

An aircraft passenger seat as described herein includes a lightweight modular construction that provides weight savings compared to conventional seats. An embodiment of the seat employs a one-piece composite structural frame and a number of comfort frame assemblies (one for each passenger) that are coupled to the structural frame. The composite construction enables the passenger seat to meet required structural specifications in a compact and lightweight configuration having a drastically reduced parts count relative to conventional seat designs. Moreover, the modular design of the seat results in a simplified installation procedure.

The above and other aspects may be carried out by an embodiment of a passenger seat assembly for an aircraft. The passenger seat assembly includes: a one-piece structural frame configured to support at least one passenger and to transfer dynamic loads associated with at least one passenger to an airframe structure of the aircraft; and a comfort frame assembly coupled to the one-piece structural frame, the comfort frame assembly being configured to cooperate with the one-piece structural frame to accommodate movement of the comfort frame assembly relative to the one-piece structural frame.

The above and other aspects may be carried out by an embodiment of a method of manufacturing a passenger seat assembly for an aircraft. The method involves: designing a one-piece composite structural frame in concert with an airframe structure of the aircraft; forming the one-piece composite structural frame such that it comprises N seat subframes corresponding to N passenger seat locations; fabricating N comfort frame assemblies for the passenger seat assembly, each of the N comfort frame assemblies comprising a respective support frame and a respective fabric carrier, which defines a seating surface, coupled to the respective support frame; and coupling the N comfort frame assemblies to the one-piece composite structural frame.

The above and other features may be carried out by an embodiment of a passenger seat assembly for an aircraft. The passenger seat assembly includes: a one-piece structural frame configured to support at least one passenger, the one-piece structural frame comprising a first seat subframe, a second seat subframe, and an aircraft mounting structure integrally formed therein; a first comfort frame assembly coupled to the first seat subframe, the first comfort frame assembly comprising a first one-piece support frame and a first fabric carrier coupled to the first one-piece support frame; and a second comfort frame assembly coupled to the second seat subframe, the second comfort frame assembly comprising a second one-piece support frame and a second fabric carrier coupled to the second one-piece support frame.

The above and other aspects may be carried out by an embodiment of a method of installing a passenger seat assembly on an aircraft. The method involves: coupling a structural frame to an airframe structure of the aircraft, the structural frame comprising a seat subframe corresponding to a passenger seat location; and thereafter coupling a comfort frame assembly to the structural frame, the comfort frame assembly comprising a support frame and a fabric carrier that defines a seating surface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 9 is a front perspective view of the one-piece structural frame shown in FIG. 3, along with one comfort frame assembly ready for installation onto the one-piece structural frame;

DETAILED DESCRIPTION

Figure 1:
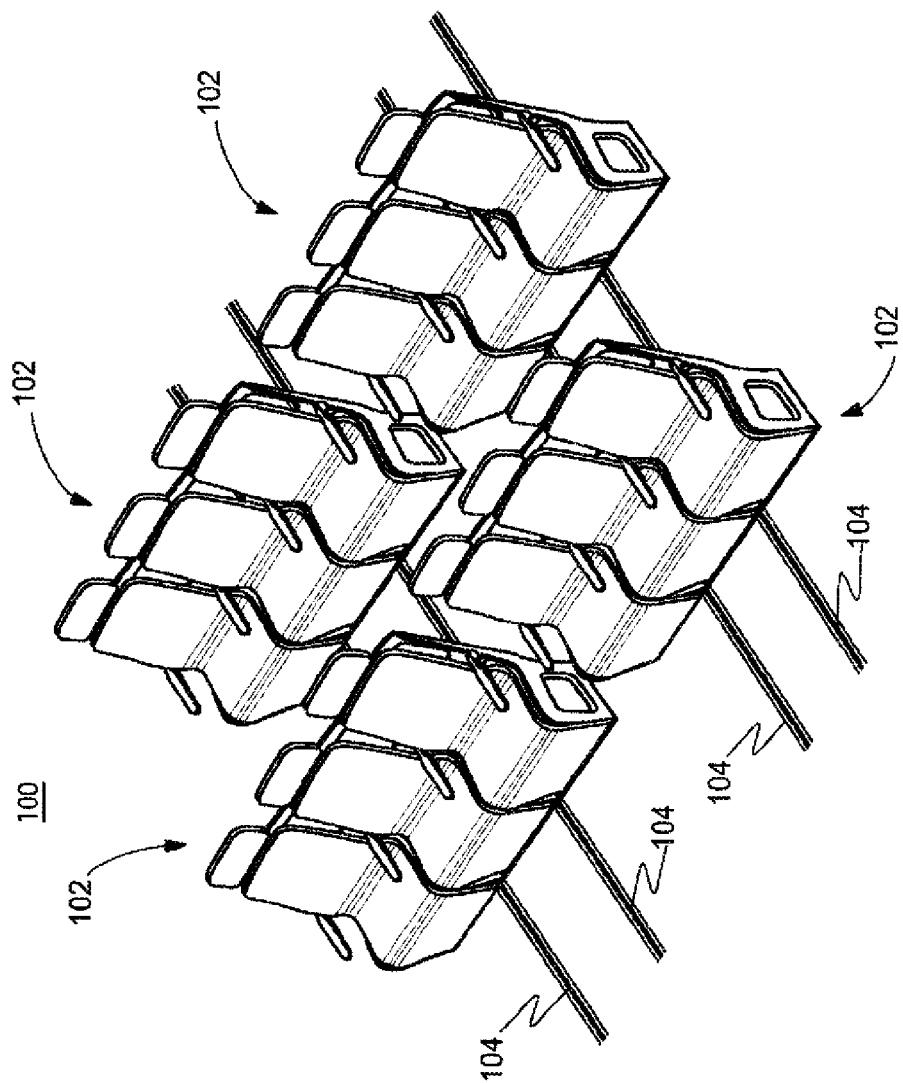
FIG. 1 is a front perspective view of an aircraft seating layout using an embodiment of a passenger seat assembly described herein.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

For the sake of brevity, conventional aspects and techniques related to the manufacture of composite components and constructions (including the handling and processing of particular materials, chemicals, compounds, resins, fibers, and substrates) may not be described in detail herein.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

An embodiment of a modular lightweight passenger seat assembly for an aircraft includes a structural frame and a number of comfort frame assemblies coupled to the structural frame. The structural frame may be realized as a composite monocoque that supports the comfort frame assembly, contains the attach points to the aircraft, the seat belt attach points, articulation mechanisms for the comfort frame assemblies, and anchor/pivot points for the comfort frame assemblies. The structural frame may also contain the mounting points for armrests and tray tables. The structural frame can be designed in concert with the airframe and could even be considered as a structural member of the fuselage. Since the structural frame is designed to work with the airframe structure, these two structures can be co-optimized for maximum weight efficiency. In contrast, conventional aircraft design methodologies consider the seats as complete, independent units that are simply fastened down to retention points (similar to cargo).

The comfort frame assembly may be realized as a fixed, ergonomically shaped perimeter frame of composite construction that captures and retains the seating/passenger support surface. The seating surface may include a pellicle base layer made from a flexible suspension textile, a central layer of a mesh cushion fabric, and a breathable decorative textile top layer. This seating surface provides for air circulation around the entire body thus equalizing body surface temperatures. Also, the uniform distribution of body weight over the suspension fabric improves circulation and eliminates pressure points known to cause discomfort. This system provides comfortable support for the passenger while significantly reducing mass compared to conventional passenger seat designs. The entire comfort frame assembly can be removed independent of the structural frame for cleaning, repair, and upgrading. This feature can permit multiple custom comfort frame appearances developed for a single, fixed comfort frame foundation. This will enable significantly lower cost customization and branding on the part of airlines as the structural frame is unaffected. The cost of refreshing or upgrading the cabin is significantly reduced with this design. It is conceivable an airline could change the comfort frame assemblies at a seasonal frequency or more often.

Another beneficial feature of the comfort frame assembly is its articulation methodology. Conventional seat configurations, excluding ultra custom premium seating, articulate by pivoting the seat back at or near the base of the lumbar area of a passenger's back. The seat pan is typically fixed, however, in certain designs it articulates as well. In the embodiments described herein, the comfort frame assembly is a fixed, rigid ergonomic frame that pivots about the ankle position of the passenger. The reason for this is to avoid lifting the knee of the passenger while providing the ability to transfer the weight of a passenger's mass to their back from their pelvis. Lifting the knee of a seat occupant typically causes the occupants foot to leave the floor which causes pressure points of discomfort in the legs of the occupant. Articulation of a seat assembly described herein may be achieved thru the use of a lift mechanism between the comfort frame assembly and the structural frame at or near the lumbar area of the seat frame.

The comfort frame assembly may also have the ability to support a variety of headrests or none at all in its simplest form. The headrest would have the capability to house video screens if so equipped.

The seat assemblies described herein are suitably configured to maintain an occupant's personal space. The comfort frame assembly articulates within the confines of the structural frame. Occupants located behind the seat assembly do not have their personal space intruded upon by the action of the occupant in front "reclining" into them.

A survey of existing seats reveals a typical three-position economy class passenger seat weights approximately 96 pounds and contains 54 major parts. In contrast, the seat assembly described herein is estimated to weigh only 63 pounds and contain only 33 major parts. On a typical 787 aircraft configuration, use of the modular seat assembly described herein could realize a 2000 pound weight reduction compared to conventional seat configurations. This could translate into a 120 nautical mile range increase or a reduction in fuel consumption.

Figure 2:
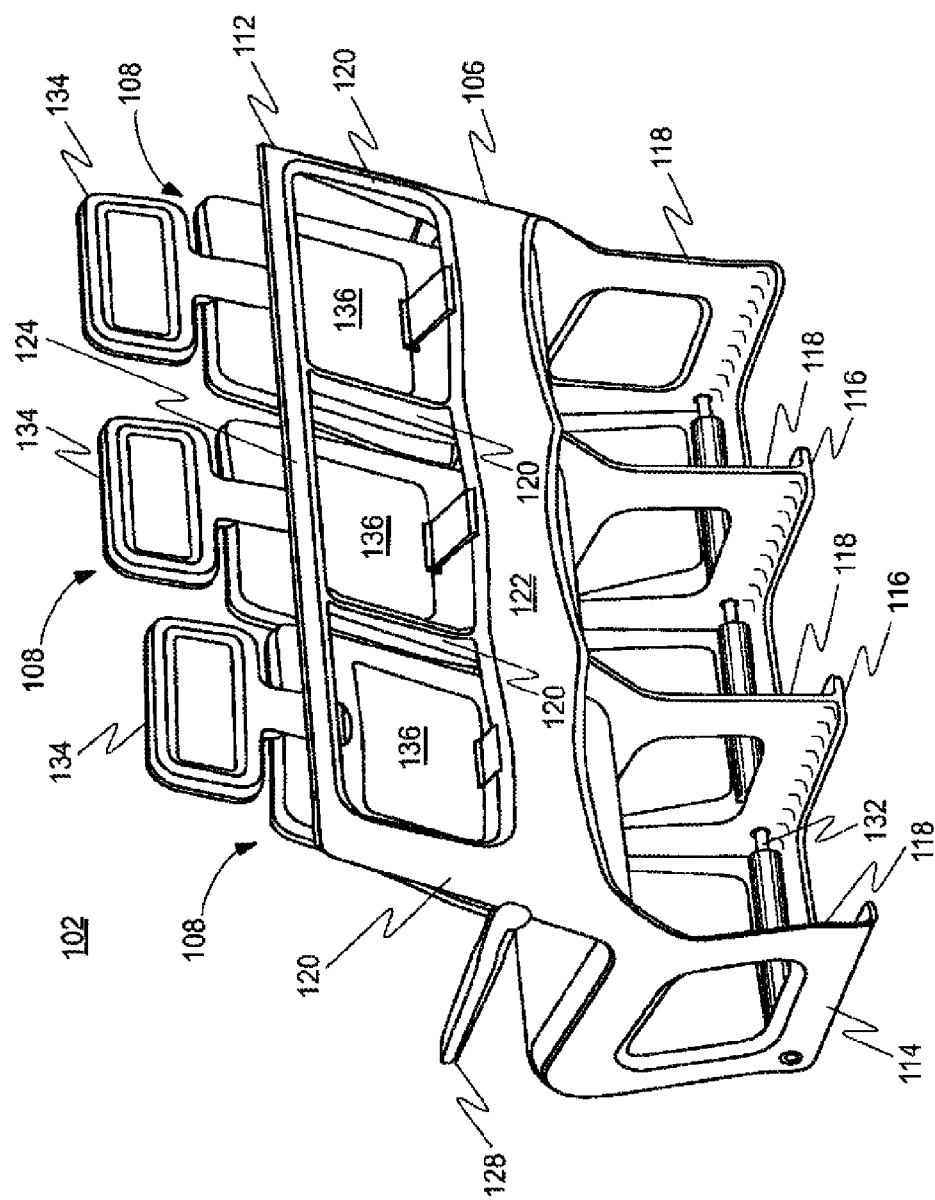
FIG. 2 is a rear perspective view of an embodiment of a passenger seat assembly.

FIG. 1 is a front perspective view of a portion of an aircraft seating layout 100 using an embodiment of a passenger seat assembly 102 described in more detail herein, and FIG. 2 is a rear perspective view of seat assembly 102. Seat assemblies 102 are suitable for use as passenger seats in an aircraft, e.g., as a row in a commercial aircraft. FIG. 1 depicts four seat assemblies 102, which might be virtually identical in a commercial aircraft deployment (in practice, a commercial aircraft may include any number of seat assemblies 102 depending upon the size and seating requirements of the aircraft). Seat assemblies 102 can be coupled to an appropriate and suitable airframe structure of the aircraft, such as the floor, one or more sidewalls, support beams, or the like. In FIG. 1, seat assemblies 102 are coupled to seat tracks 104, which provide a mounting interface between seat assemblies 102 and the airframe structure of the aircraft. As described in more detail below, seat assemblies 102 may be structurally designed in concert with the airframe structure of the aircraft such that static and dynamic loads associated with seat assemblies 102 (and passengers on seat assemblies 102) are cooperatively handled by seat assemblies 102 and the airframe structure. For example, seat assemblies 102 and the airframe structure may be cooperatively designed to consider load paths from seat assemblies 102 to the airframe structure. This design approach allows seat assemblies 102 to be lighter and less bulky than their conventional counterparts, which are typically designed in a stand-alone manner.

Although each seat assembly 102 is depicted as a triple seat assembly, the concepts, techniques, features, and technologies described herein can be extended to any practical seat configuration, such as a double seat, a quad seat, a single seat, or a seat configured to accommodate any number of passengers, limited only by practical size restrictions, structural material properties, and aircraft interior configuration regulations. The triple seat configuration depicted in the figures is not intended to limit or otherwise restrict the use or scope of the described embodiments in any way.

Seat assembly 102 includes two primary modular components: a structural frame 106 and a plurality of comfort frame assemblies 108, which are coupled to and supported by structural frame 106 when seat assembly 102 is deployed. This modular approach assigns the two main functions of a passenger seat (comfortably support the passenger and restrain the passenger) to comfort frame assemblies 108 and structural frame 106, respectively. In this embodiment, seat assembly 102 has three comfort frame assemblies 108—one for each passenger seat location. Comfort frame assemblies 108 may be virtually identical in a commercial aircraft deployment.

By having the structural frame a separate module from the comfort frame, they do not have to be installed in the aircraft at the same time. The structural frame could be installed much earlier in the build sequence of the aircraft than the comfort frame. It is conceivable that the two modules could be designed and fabricated by different manufacturers.

Figure 3:
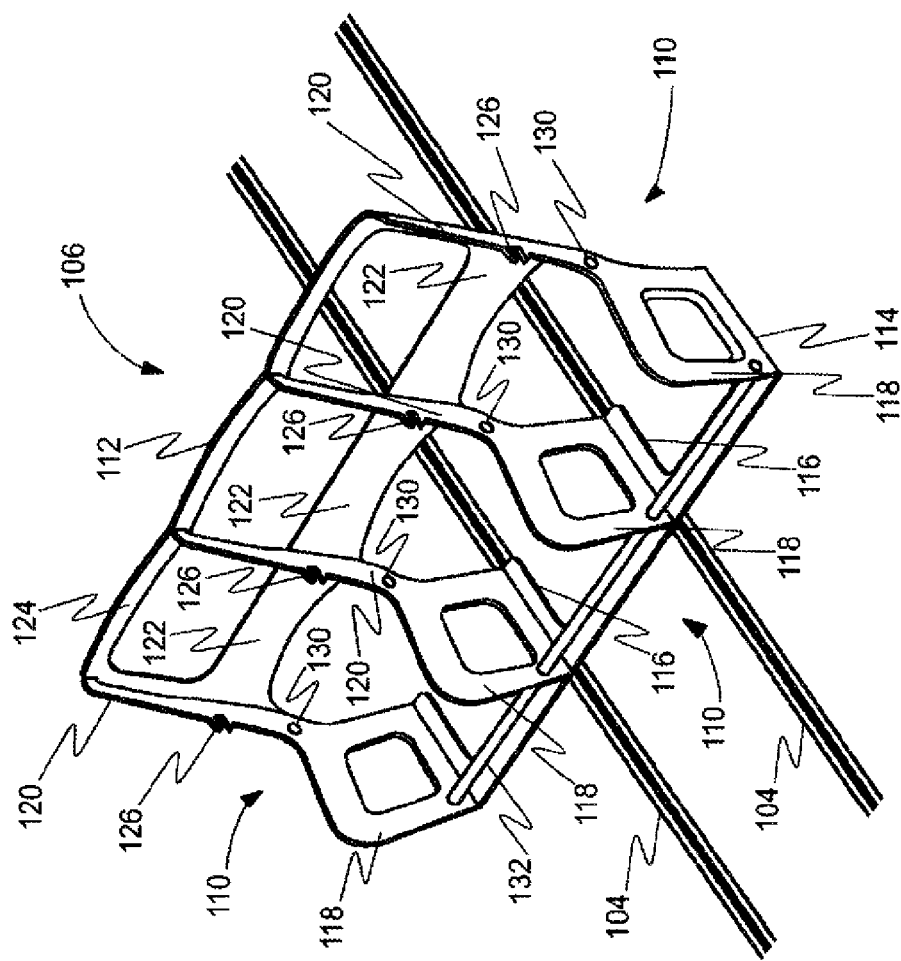
FIG. 3 is a front perspective view of a one-piece structural frame suitable for use with the passenger seat shown in FIG. 2.

FIG. 3 is a front perspective view of structural frame 106 as installed on seat tracks 104. Structural frame 106 is suitably configured to support at least one passenger (three passengers in the illustrated embodiment), and to transfer dynamic loads associated with the passenger(s) to an airframe structure of the aircraft. For example, structural frame 106 can be designed to facilitate the transfer of loads from seat assembly 102 to seat tracks 104, the floor of the aircraft, the sidewalls of the aircraft, or other structural components of the aircraft.

Structural frame 106 is fabricated as a one-piece component, which reduces the part count relative to conventional seat designs, and which simplifies assembly and installation of seat assembly 102. Structural frame 106 may be designed and fabricated to be a monocoque construction, i.e., such that it absorbs and/or transfers most of the loads and stresses to which seat assembly 102 is subjected. In certain embodiments, structural frame 106 is a one-piece composite construction, for example, a molded composite component. A composite structural frame 106 is desirable because of its ability to be molded into complex shapes, its high strength to weight ratio, and its ability to sustain and transfer dynamic loads to the airframe structure. In practice, structural frame 106 can be tuned according to its intended seating capacity (three passengers for seat assembly 102). In this regard, structural frame 106 and seat assembly 102 in general are suitably configured to provide structural support for three adult passengers and to satisfy any structural requirements, such as, for example, the "16G" dynamic testing mandated by the Federal Aviation Administration.

An embodiment of structural frame 106 may be fabricated using any number of materials and compositions, including, without limitation: thermoplastic resin systems such as polyetherimide (PEI) or polyetherketoneketone (PEKK). Thermoset epoxy resin systems, with appropriate flammability controls may also be used. Carbon graphite fiber, glass fiber, and/or aramid fiber (e.g., KEVLAR) as well as core materials such as foam, honeycomb, or the like, may be used as structural reinforcements in certain embodiments. Metallic inserts may be used in key high stress areas and attach points. The particular composite construction for structural frame 106 is suitably configured to provide the desired toughness, weight, strength, rigidity, and rip-stop characteristics.

Structural frame 106 generally includes N seat subframes 110 corresponding to N passenger seat locations (in the illustrated embodiment, N equals three). Considering the one-piece construction of structural frame 106, seat subframes 110 represent integral features of structural frame 106. Structural frame 106 has an upper end 112, a lower end 114, and an aircraft mounting structure 116 formed therein. Aircraft mounting structure 116, which is located at lower end 114, is suitably configured to accommodate coupling to the airframe structure of the aircraft. Aircraft mounting structure 116 may, for example, be designed for compatibility with seat tracks 104 that are integrated into the floor of the aircraft. For this embodiment, aircraft mounting structure 116 is realized as a number of mounting "feet" or "rails" that cooperate with seat tracks 104 and/or accommodate fasteners or coupling mechanisms that are utilized to attach structural frame 106 to seat tracks 104.

Lower end 114 generally represents the base of structural frame 106, and upper end 112 generally represents the seatback portion of structural frame 106. Structural frame 106 may also include the following integrated features formed therein: a number of support legs 118; a number of back support elements 120; a lower back crossbeam 122; and an upper back crossbeam 124. As depicted in the figures, aircraft mounting structure 116 is coupled to support legs 118, which are coupled to back support elements 120. Back support elements 120 extend upwardly and in a slightly angled orientation from support legs 118. In this embodiment, two of the support legs 118 and two of the back support elements 120 are common to two of the seat subframes 110. On the other hand, the outermost support legs 118 and the outermost back support elements 120 are utilized for only one seat subframe 110. Lower back crossbeam 122 and upper back crossbeam 124 are coupled to each back support element 120. Upper back crossbeam 124 may also be configured to serve as a handle for passengers located behind seat assembly 102; this handle can assist the passengers during ingress and egress.

Structural frame 106 may also include armrest coupling features 126 for the attachment of armrests 128 to seat assembly 102, and seat belt coupling features 130 for the attachment of passenger seat belts to seat assembly 102. Armrest coupling features 126 may be realized as holes, notches, brackets, or pins formed in or affixed to back support elements 120 (see FIG. 3). Seat belt coupling features 130 may be realized as holes, brackets, clevises, or pins formed in or affixed to back support elements 120 and/or to support legs 118. Notably, structural frame 106 and seat belt coupling features 130 can be configured and certified to withstand dynamic loading that might be imparted by the seat belts.

Seat assembly 102 utilizes N comfort frame assemblies 108, which respectively correspond to the N seat subframes 110 (in the illustrated embodiment, N equals three). Each comfort frame assembly 108 is suitably configured to cooperate with structural frame 106 to accommodate movement of comfort frame assembly 108 relative to structural frame 106. For this embodiment, each comfort frame assembly 108 can pivot (recline) independently relative to structural frame 106. Moreover, structural frame 106 itself is designed to be a "fixed" support component for comfort frame assemblies 108. Thus, comfort frame assemblies 108 move within the fixed confines of structural frame 106. Accordingly, the space behind seat assembly 102 remains the same regardless of the recline position of comfort frame assembly 108. This enhances the comfort of the passengers located behind seat assembly 102.

Figure 6:
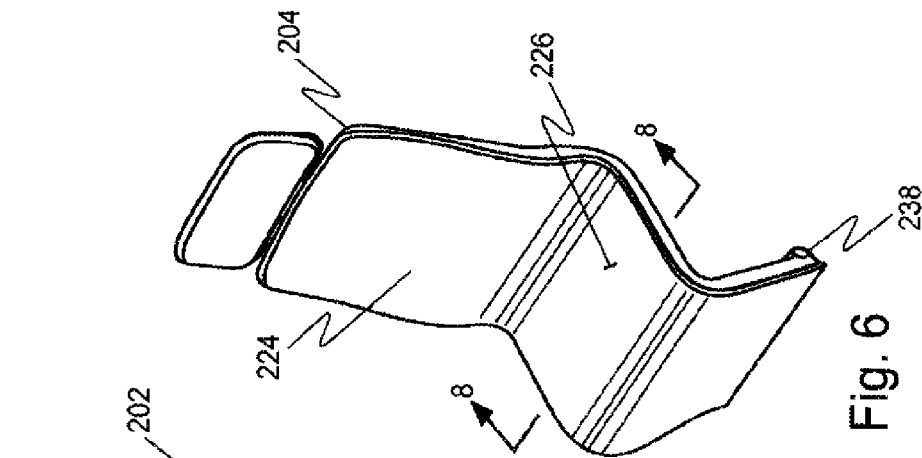
FIG. 6 is a front perspective view of another comfort frame assembly suitable for use with the passenger seat shown in FIG. 2.

Each comfort frame assembly 108 is fabricated from two main components: a support frame 200 and a fabric carrier 218 coupled to the support frame, where the fabric carrier defines a seating surface of the respective comfort frame assembly 108. In this regard, FIG. 4 is a front perspective view of a one-piece support frame 200 suitable for use with seat assembly 102, FIG. 5 is a front perspective view of a first embodiment of a comfort frame assembly 202 suitable for use with seat assembly 102, and FIG. 6 is a front perspective view of a second embodiment of a comfort frame assembly 204 suitable for use with seat assembly 102.

Figure 4:
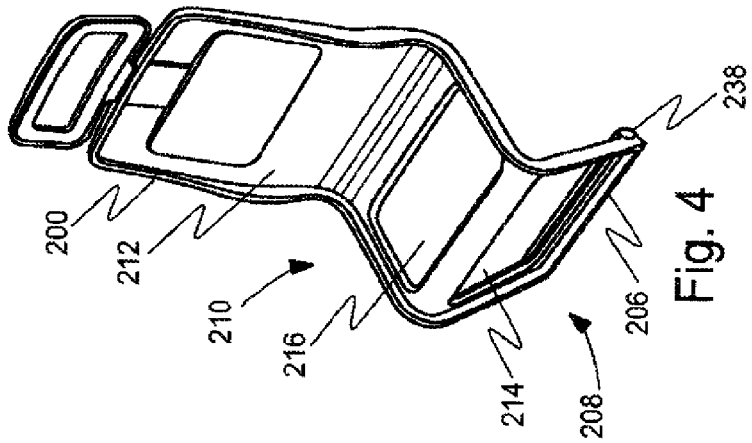
FIG. 4 is a front perspective view of a one-piece support frame suitable for use with the passenger seat shown in FIG. 2.

Referring to FIG. 4, support frame 200 is fabricated as a one-piece component, which reduces the parts count relative to conventional seat designs, and which simplifies assembly and installation of seat assembly 102. In certain embodiments, support frame 200 is a one-piece composite construction, for example, a lightweight molded composite component. An embodiment of support frame 200 may be fabricated using any number of materials and compositions, including, without limitation, the materials and compositions described above in the context of structural frame 106.

As depicted in FIG. 4, support frame 200 is ergonomically shaped and contoured according to the desired seat configuration. This particular embodiment includes a lower edge 206, a lower leg frame section 208 coupled to lower edge 206, a seating frame section 210 coupled to lower leg frame section 208, and a back section 212 coupled to and extending from seating frame section 210. Notably, these features are formed as integral features of one-piece support frame 200. In other words, these features are coupled together in a seamless manner. Back section 212 is preferably a solid panel section, which isolates and protects the passenger's back from objects behind the seat assembly. Lower leg frame section 208 represents an outer frame that defines an opening 214, and seating frame section 210 represents an outer frame that defines an opening 216; these openings 214/216 are covered with material in the finished assembly. These openings 214/216 allow the fabric carrier to flex and provide ventilation for increased passenger comfort. Indeed, each comfort frame assembly is suitably configured to reduce pressure points and to provide passive temperature control due to air circulation around the passenger.

Figure 5:
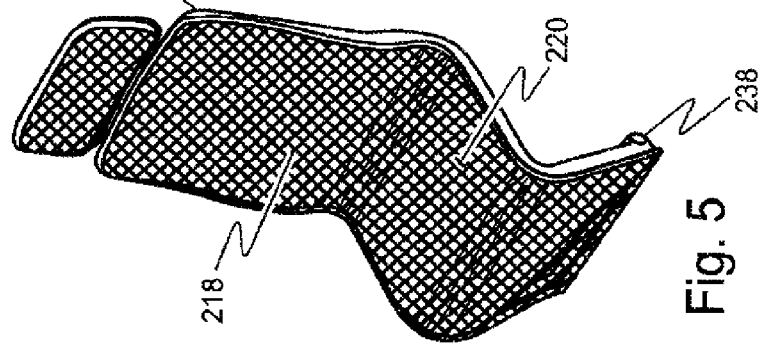
FIG. 5 is a front perspective view of a comfort frame assembly suitable for use with the passenger seat shown in FIG. 2.

FIG. 5 depicts comfort frame assembly 202, which includes an embodiment of a fabric carrier 218 coupled thereto. Fabric carrier 218 may include a fabric carrier ring (hidden from view in FIG. 5) and at least one layer of material coupled to the fabric carrier ring. In certain embodiments, the fabric carrier ring roughly corresponds to the perimeter of fabric carrier 218, and the fabric carrier ring is suitably configured to secure the at least one layer of material to support frame 200. Moreover, in this embodiment, the fabric carrier ring roughly corresponds to the outer edge of support frame 200. FIG. 5 depicts an embodiment where the at least one layer of material includes a flexible diaphragm layer (hidden from view in FIG. 5) that is configured to support the passenger, and a three-dimensional mesh layer 220 over the flexible diaphragm layer. Here, mesh layer 220 represents the exposed outer layer of fabric carrier 218. At least one layer of material preferably covers the entire interior space defined by the fabric carrier ring.

The flexible diaphragm layer may be formed from a relatively tough, stretchable, and resilient material or combination of materials, such as polyester, nylon, KEVLAR, NOMEX, or the like. This diaphragm layer primarily serves to support the weight of the occupant.

Figure 7:
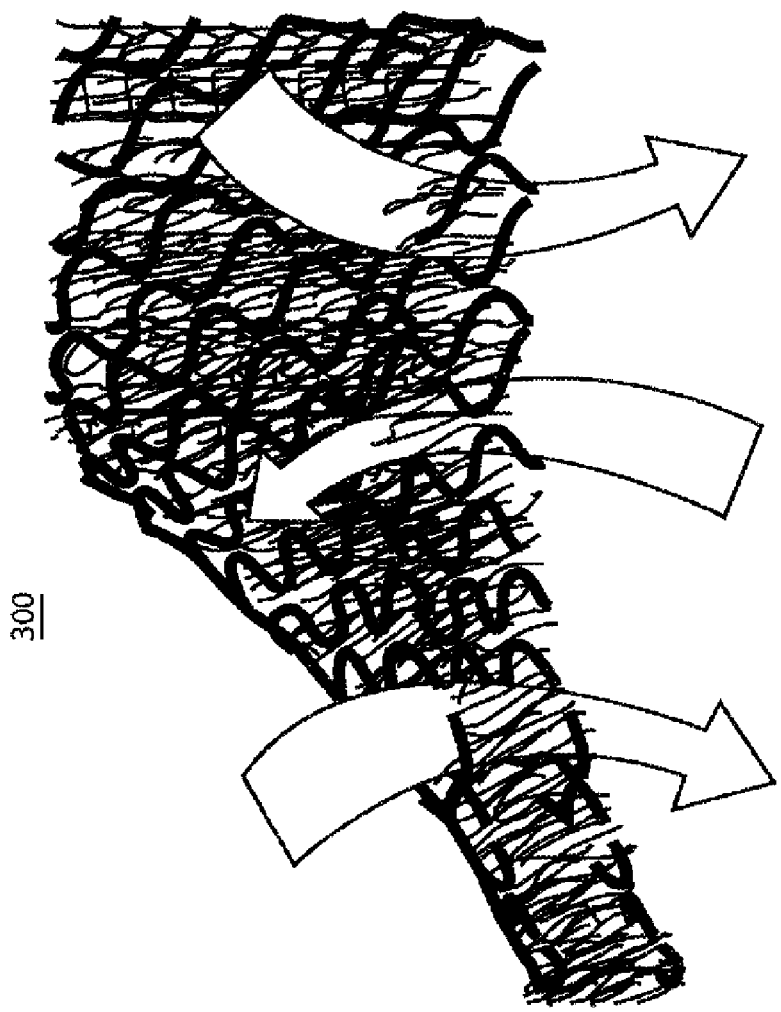
FIG. 7 is a perspective view of a mesh material suitable for use with an embodiment of a comfort frame.

FIG. 7 is a perspective view of a mesh material 300 suitable for use as mesh layer 220. Mesh material 300 may be formed from polyester, modacrylic, nylon, or the like. Mesh material 300 has upper and lower surfaces, a scrim layer, that resemble netting, and spacing fibers, thread, or mesh between the upper and lower surfaces. The spacing mesh is used to maintain a three-dimensional structure for mesh material 300. The spacing mesh provides cushioning and ventilation for mesh material 300. The arrows in FIG. 7 indicate the manner in which air can flow through mesh material 300.

FIG. 6 depicts comfort frame assembly 204, which includes another embodiment of a fabric carrier 224 coupled thereto. Fabric carrier 224 may include a fabric carrier ring (hidden from view in FIG. 6) and at least one layer of material coupled to the fabric carrier ring. In certain embodiments, the fabric carrier ring roughly corresponds to the perimeter of fabric carrier 224, and the fabric carrier ring is suitably configured to secure the at least one layer of material to support frame 200. Moreover, in this embodiment, the fabric carrier ring roughly corresponds to the outer edge of support frame 200. FIG. 6 depicts an embodiment where the at least one layer of material includes a flexible diaphragm layer (hidden from view in FIG. 6) that is configured to support the passenger, a three-dimensional mesh layer (also hidden from view) over the flexible diaphragm layer, and an upholstery layer 226 over the mesh layer. These material layers are consolidated in a sandwich construction. Mesh material 300 may be utilized for the mesh layer in this embodiment. Here, upholstery layer 226 represents the exposed outer layer of fabric carrier 224. Upholstery layer 226 may include any suitable material or combination of materials, including, without limitation: cloth; leather; leatherette; microfiber; or other materials typically used in aircraft upholstery applications. At least one layer of material preferably covers the entire interior space defined by the fabric carrier ring.

Figure 8:
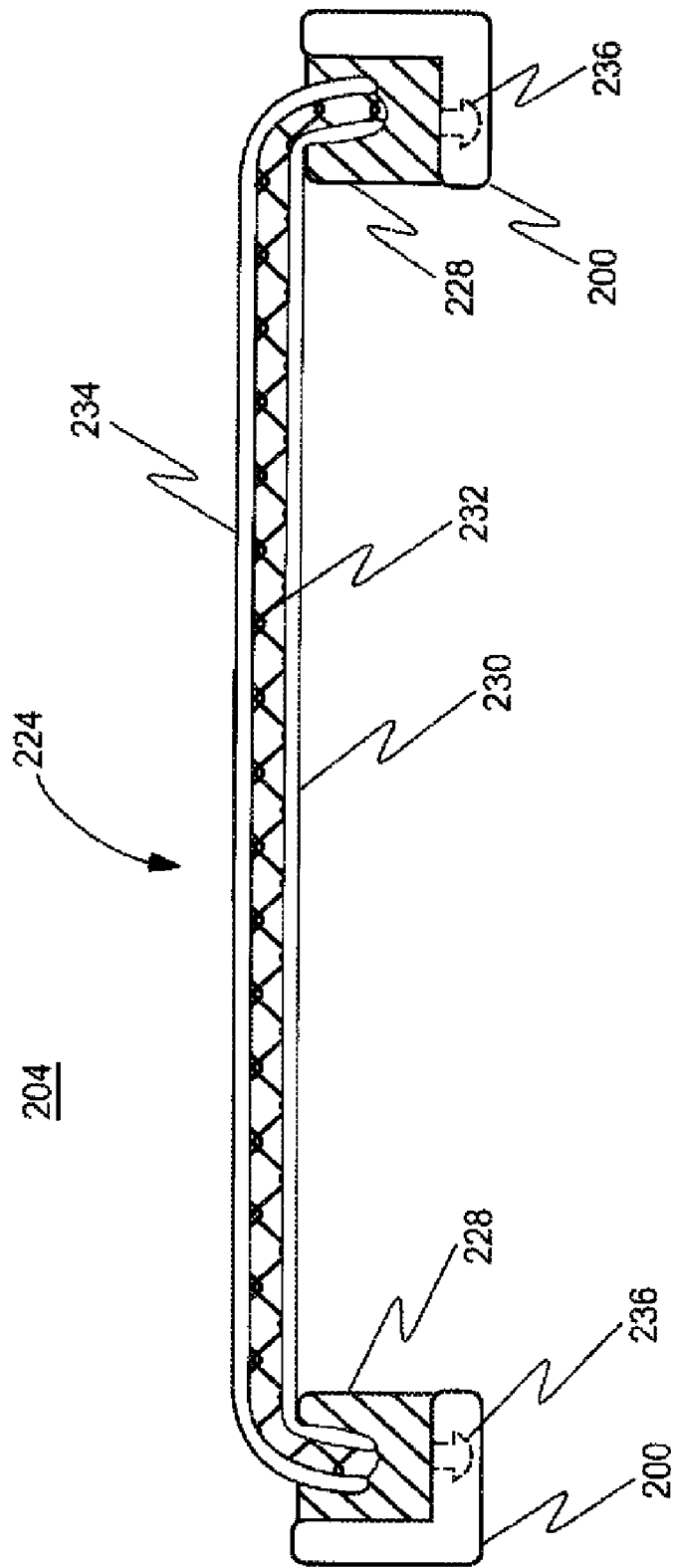
FIG. 8 is a cross sectional view of the comfort frame assembly shown in FIG. 6, as viewed from line 8-8.

As mentioned above, a comfort frame assembly may utilize a suitably configured fabric carrier. In this regard, FIG. 8 is a cross sectional view of comfort frame assembly 204 as viewed from line 8-8 in FIG. 6. This embodiment of support frame 200 has a generally L-shaped cross section proximate seating frame section 210, as shown in FIG. 8. As described above, fabric carrier 224 includes a fabric carrier ring 228, a flexible diaphragm layer 230, a three-dimensional mesh layer 232 over flexible diaphragm layer 230, and an outer upholstery layer 234 over mesh layer 232. Fabric carrier ring 228 may be molded from a variety of suitable thermoplastic materials or the like. Fabric carrier 224 may be manufactured by encapsulating at least a portion of flexible diaphragm layer 230, at least a portion of mesh layer 232, and at least a portion of outer upholstery layer 234 in fabric carrier ring 228. For example, the edges of these material layers can be encapsulated in fabric carrier ring 228 such that the material layers span the interior space of fabric carrier ring 228. FIG. 8 illustrates how these material layers might be encapsulated in fabric carrier ring 228 in one embodiment. In an alternate embodiment, the material layers completely cover and hide fabric carrier ring 228, resulting in a smooth transition from fabric carrier 224 to support frame 200.

Fabric carrier 224 can be coupled to support frame 200 using any suitable means including without limitation: fasteners, an adhesive, snaps, clips, by bonding, or the like. For example, fabric carrier ring 228 may include prongs, barbs, or other features 236 that enable fabric carrier 224 to be secured to support frame 200 during the manufacture of comfort frame assembly 204.

It should be appreciated that the comfort frame assemblies 204 can be fabricated separately from the corresponding structural frame 106. Indeed, the comfort frame assemblies 204 and the structural frame 106 can be fabricated by different vendors or manufacturing entities. This makes it easy to accommodate custom fabric/leather requests for purposes of branding, refurbishing, and upgrading. After fabrication of the main components (i.e., the structural frame 106 and the comfort frame assemblies 204), the comfort frame assemblies 204 may be installed on the structural frame 106 before or after the structural frame 106 is coupled to the airframe. In this regard, FIG. 9 is a front perspective view of structural frame 106, along with one comfort frame assembly 108 ready for installation onto structural frame 106.

A modular passenger seat assembly 102 as described herein may also include a suitably configured pivot mechanism that accommodates pivoting (or other modes of travel) of the comfort frame assembly 108 relative to the structural frame 106. The pivot mechanism may also accommodate features that permit the installation and removal of the comfort frame assembly 108 from the structural frame 106. Referring to FIGS. 2-6, the pivot mechanism may be configured to accommodate pivoting of comfort frame assemblies 108 about an axis that is located near lower end 114 of structural frame 106. For this embodiment, lower end 114 roughly corresponds to a passenger ankle or foot location, and the pivot axis corresponds to a rod 132 or other hinge element of seat assembly 102. For this embodiment, the pivot mechanism includes rod 132 and tube sections 238 formed in support frame 200 near lower edge 206 (see FIG. 4). Tube sections 238 are pivotally coupled to rod 132, which is in turn secured to lower end 114 of structural frame 106. Seat assembly 102 may include actuators, springs, control mechanisms, mechanical travel stops, and other features that allow the passenger to adjust the position of comfort frame assembly 108 relative to structural frame 106.

Figure 11:
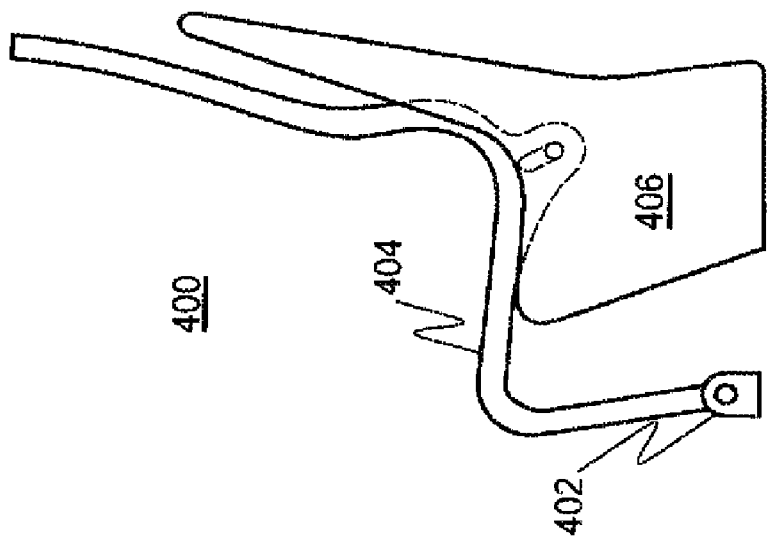
FIG. 11 is a side and partially phantom view of an embodiment of a passenger seat assembly in a fully upright position.
Figure 10:
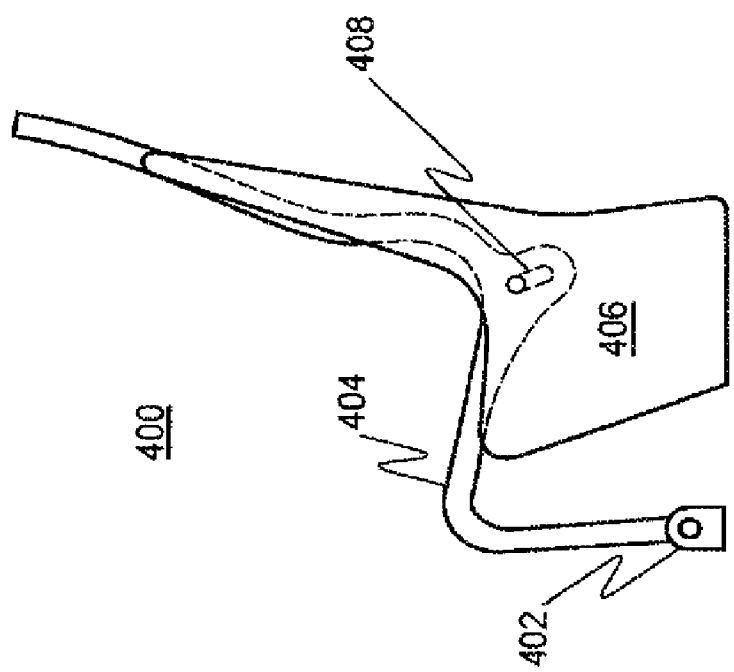
FIG. 10 is a side and partially phantom view of an embodiment of a passenger seat assembly in a fully reclined position.

FIG. 10 is a side and partially phantom view of an embodiment of a passenger seat assembly 400 in a fully reclined position, and FIG. 11 is a side and partially phantom view of passenger seat assembly 400 in a fully upright position. Unlike the embodiment described above, seat assembly 400 utilizes a separate mounting element 402 for its comfort frame assembly 404. Moreover, seat assembly 400 employs different configurations for comfort frame assembly 404 and the structural frame 406.

FIG. 10 illustrates the manner in which comfort frame assembly 404 is retained within the confines of structural frame 406 when in the fully reclined position. When in the fully upright position (FIG. 11), structural frame 406 remains in the same position and comfort frame assembly 404 stays within the confines of structural frame 406. This embodiment of comfort frame assembly 404 includes a travel guide 408 that cooperates with a travel stop formed in structural frame 406. The travel stop limits movement of comfort frame assembly 404, and the travel stop may define the fully reclined and fully upright positions.

An embodiment of a modular passenger seat assembly may be designed and constructed in a manner that allows certification with respect to takeoff and landing forces and stresses while in its reclined position. Such certification may be mandated by government entities, such as the Federal Aviation Administration. In other words, the seat assembly can be suitably configured such that its fully reclined position is the "default" position for takeoff and landing. In contrast, existing commercial aircraft seats are certified for takeoff and landing in the fully upright position, which may be uncomfortable for the passengers. Certification of the seat assembly in its fully reclined position is desirable because most passengers tend to keep their seats in a reclined position during flight and because the fully reclined position makes ingress and egress easier for the passengers.

A modular passenger seat assembly as described herein may also include headrests 134 and/or tray tables 136 (FIG. 2). A headrest 134 may be constructed in a manner similar to that described above for the comfort frame assemblies. Headrests 134 may be fabricated as separate components, and headrests 134 can be installed before or after the comfort frame assemblies 108 are coupled to the structural frame 106. Tray tables 136 may be designed for storage in the back of the support frames 200 of the comfort frame assemblies 108, as depicted in FIG. 2. The back of the structural frame 106 may include appropriately sized openings formed therein to accommodate the lowering of tray tables 136.

Figure 12:
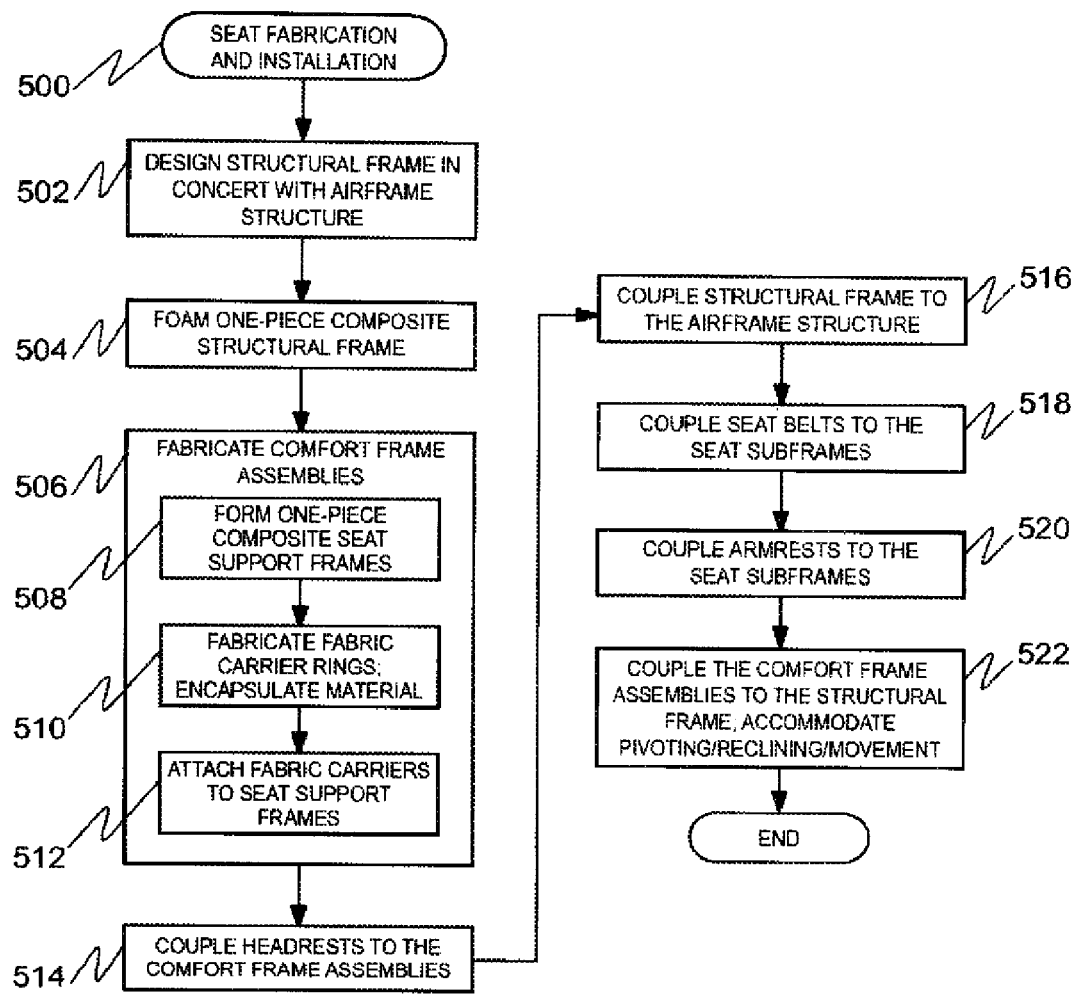
FIG. 12 is a flow chart that depicts an embodiment of a seat fabrication and installation process.

FIG. 12 is a flow chart that depicts an embodiment of a seat fabrication and installation process 500, which may be performed for the manufacture and/or installation of a modular passenger seat assembly such as seat assembly 102. For illustrative purposes, the following description of process 500 may refer to elements mentioned above in connection with FIGS. 1-11. It should be appreciated that process 500 may include any number of additional or alternative tasks, the tasks shown in FIG. 12 need not be performed in the illustrated order, and process 500 may be incorporated into a more comprehensive procedure or process having additional functionality not described in detail herein.

Process 500 may begin by designing a one-piece structural frame for the seat assembly in concert with an airframe structure of the aircraft (task 502). As mentioned above, the structural frame can be designed as a structural member or an integral component of the airframe structure and/or to leverage the structural characteristics of the airframe structure. This allows the seat assembly to be manufactured with less weight because it relies on the airframe structure for some dynamic load bearing capabilities. Consequently, the structural frame may be specifically designed for use with a particular model or type of aircraft. After the structural frame has been designed, it can be formed (task 504) in the manner described above such that it includes N seat subframes corresponding to N passenger seat locations. The structural frame is preferably formed as a one-piece composite frame.

In addition, N comfort frame assemblies are fabricated (task 506) for the passenger seat assembly, where each comfort frame assembly includes a respective support frame and a respective fabric carrier that defines a seating surface. In some embodiments, each comfort frame assembly is fabricated as follows. A one-piece composite seat support frame is formed (task 508), preferably using a composite molding technique. In addition, a fabric carrier is formed by encapsulating at least one layer of material in a fabric carrier ring; this encapsulating may be performed concurrently with the fabrication of the fabric carrier ring itself (task 510). Thereafter, the fabric carrier can be attached to the seat support frame (task 512) to complete the comfort frame assembly. At this time, headrests may be coupled to the respective comfort frame assemblies (task 514). Alternatively, task 514 may be performed later in seat fabrication and installation process 500.

After the structural frame and the comfort frame assemblies (or assembly) have been manufactured, the seat assembly is ready to be installed on the aircraft. The structural frame can be transported into the aircraft and coupled (task 516) to an airframe structure of the aircraft (e.g., the floor, sidewalls, and/or seat tracks). At this time, a respective seat belt may be coupled to each of the seat subframes of the structural frame (task 518). Alternatively, task 518 may be performed at another point in seat fabrication and installation process 500. In addition, armrests may be coupled to the seat subframes (task 520) or to any suitable location on the structural frame. Alternatively, task 520 may be performed at another point in seat fabrication and installation process 500.

Eventually, the comfort frame assemblies are coupled to the structural frame (task 522) to provide the seating surfaces for the seat assembly. In connection with task 522, each comfort frame assembly may be pivotally coupled to its respective seat subframe to accommodate pivoting of the comfort frame assembly relative to the structural frame. This allows the comfort frame assembly to move, recline, and pivot within the structural frame.

The modular design of the seat assembly makes installation and replacement of fabric carriers much simpler and less time consuming compared to the installation of conventional aircraft seats. The modular design of the seat assembly accommodates a two-stage installation procedure where the structural frame is installed relatively early in the aircraft manufacturing process, while the comfort frame assemblies are installed relatively late in the manufacturing process.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of manufacturing a passenger seat assembly for an aircraft, the method comprising:
designing a one-piece composite structural frame in concert with an airframe structure of the aircraft;
forming the one-piece composite structural frame such that it comprises N seat subframes corresponding to N passenger seat locations;
fabricating N comfort frame assemblies for the passenger seat assembly, each of the N comfort frame assemblies comprising a respective support frame and a respective fabric carrier, which defines a seating surface, coupled to the respective support frame; and
coupling the N comfort frame assemblies to the one-piece composite structural frame to accommodate movement of the comfort frame assembly relative to the one-piece structural frame by a pivot mechanism, said pivot mechanism connected to said one-piece structural frame and said comfort frame wherein said pivot mechanism is configured to accommodate pivoting of the entire comfort frame assembly relative to the one-piece structural frame, said pivoting about an axis parallel to a width of the comfort frame directly adjacent to a floor portion of an airplane structure of said aircraft.

2. The method of claim 1, wherein coupling the N comfort frame assemblies to the one-piece composite structural frame comprises pivotally coupling each of the N comfort frame assemblies to a respective one of the N seat subframes to accommodate pivoting of the N comfort frame assemblies relative to the one-piece composite structural frame.

3. The method of claim 1, wherein designing the one-piece composite structural frame comprises designing the one-piece composite structural frame as a structural member of the airframe structure of the aircraft.

4. The method of claim 1, further comprising fabricating N fabric carriers for the N comfort frame assemblies, wherein fabricating each of the N fabric carriers comprises encapsulating a portion of a layer of material in a respective fabric carrier ring.

5. The method of claim 1, further comprising coupling a respective seat belt to each of the N seat subframes.

* * * * *